United States Patent
Pope et al.

(10) Patent No.: US 9,268,796 B2
(45) Date of Patent: Feb. 23, 2016

(54) SYSTEMS AND METHODS FOR QUANTILE ESTIMATION IN A DISTRIBUTED DATA SYSTEM

(75) Inventors: Scott Pope, Raleigh, NC (US); Georges H. Guirguis, Cary, NC (US); Oliver Schabenberger, Cary, NC (US)

(73) Assignee: SAS Institute Inc., Cary, NC (US)

( * ) Notice: Subject to any disclaimer, the term of this patent is extended or adjusted under 35 U.S.C. 154(b) by 788 days.

(21) Appl. No.: 13/482,095

(22) Filed: May 29, 2012

(65) Prior Publication Data
US 2013/0325825 A1    Dec. 5, 2013

(51) Int. Cl.
*G06F 17/30* (2006.01)

(52) U.S. Cl.
CPC .............................. *G06F 17/30283* (2013.01)

(58) Field of Classification Search
CPC ....................................................... G06F 17/30
USPC .......................................................... 707/752
See application file for complete search history.

(56) References Cited

U.S. PATENT DOCUMENTS

| | | | | |
|---|---|---|---|---|
| 5,018,088 A * | 5/1991 | Higbie | ........................... | 702/194 |
| 5,734,744 A * | 3/1998 | Wittenstein et al. | ........... | 382/166 |
| 6,985,467 B2 * | 1/2006 | Lomp et al. | ..................... | 370/335 |
| 7,020,111 B2 * | 3/2006 | Ozluturk et al. | .............. | 370/335 |
| 7,162,249 B2 * | 1/2007 | Westphal | ....................... | 455/450 |
| 7,219,034 B2 * | 5/2007 | McGee et al. | ................. | 702/180 |
| 7,409,357 B2 * | 8/2008 | Schaf et al. | ................... | 705/7.28 |
| 8,611,586 B1 * | 12/2013 | Brodeur et al. | ............... | 382/100 |
| 8,868,573 B2 * | 10/2014 | Chu et al. | ....................... | 707/752 |
| 2003/0088542 A1 * | 5/2003 | McGee et al. | .................... | 707/1 |
| 2003/0118232 A1 * | 6/2003 | Li et al. | .......................... | 382/170 |
| 2006/0002364 A1 * | 1/2006 | Westphal | ....................... | 370/346 |
| 2009/0222243 A1 * | 9/2009 | Zoldi et al. | ......................... | 703/2 |
| 2010/0292995 A1 * | 11/2010 | Bu et al. | .......................... | 705/1.1 |
| 2013/0218908 A1 * | 8/2013 | Chu et al. | ....................... | 707/752 |
| 2013/0218909 A1 * | 8/2013 | Chu et al. | ....................... | 707/752 |

OTHER PUBLICATIONS

Guirguis, Georges H., "Conformal Mapping: A Robust Method for Computing Quantiles", Communications in Statistics, Simulation and Computations, vol. 33, No. 4, pp. 991-1006, 2004.

(Continued)

*Primary Examiner* — Baoquoc N To
(74) *Attorney, Agent, or Firm* — Kilpatrick Townsend & Stockton LLP

(57) ABSTRACT

In accordance with the teachings described herein, systems and methods are provided for estimating quantiles for data stored in a distributed system. In one embodiment, an instruction is received to estimate a specified quantile for a variate in a set of data stored at a plurality of nodes in the distributed system. A plurality of data bins for the variate are defined that are each associated with a different range of data values in the set of data. Lower and upper quantile bounds for each of the plurality of data bins are determined based on the total number of data values that fall within each of the plurality of data bins. The specified quantile is estimated based on an identified one of the plurality of data bins that includes the specified quantile based on the lower and upper quantile bounds.

32 Claims, 13 Drawing Sheets

(56) References Cited

OTHER PUBLICATIONS

Jain et al., "The $P^2$ Algorithm for Dynamic Calculation of Quantiles and Histograms Without Storing Observations", Simulation Modeling and Statistical Computing, Oct. 1985, vol. 28, No. 10, pp. 1076-1085.

Raatikainen, Kimmo, "Simultaneous Estimation of Several Persentiles", University of Helsinki, Department of Computer Science, Helsinki, Finland, Oct. 1986, pp. 159-164.

* cited by examiner

|  | Server1 | Server2 | Combined Result |
|---|---|---|---|
| Minimum | 1.1 | 7.2 | 1.1 |
| Maximum | 98.4 | 97.8 | 98.4 |
| Count | 50 | 50 | 100 |

Fig. 5B

| Bins | Server1 (504) | Server2 (506) | Combined (508) | Upper Percentage for Bin (510) |
|---|---|---|---|---|
| Bin1 (1.1<=x<25.45) | 14 | 11 | 25 | 25% |
| Bin2 (25.45<=x<49.76) | 12 | 11 | 23 | 48% |
| Bin3 (49.76<=x<74.07) | 5 | 16 | 21 | 69% |
| Bin4 (74.07<=x<=98.4) | 19 | 12 | 31 | 100% |

| Bins | Server1 (514) | Server2 (516) | Combined (518) | Upper Percentage for Bin (520) |
|---|---|---|---|---|
| Pre-Bin (1.1<=x<74.07) | Not reported | Not reported | 69 (prev. pass) | 69% |
| Bin4.1 (74.07<=x<80.14) | 4 | 1 | 5 | 74% |
| Bin4.2 (80.14<=x<86.22) | 4 | 3 | 7 | 81% |
| Bin4.3 (86.22<=x<92.30) | 4 | 2 | 6 | 87% |
| Bin4.4 (92.30<=x<=98.4) | 7 | 6 | 13 | 100% |

Fig. 6A

| | Server1 | Server2 | Combined Result |
|---|---|---|---|
| Minimum | 1.1 | 7.2 | 1.1 |
| Maximum | 98.4 | 97.8 | 98.4 |
| Count | 50 | 50 | 100 |

Fig. 6B

| Bins | Server1 | Min | Max | Server2 | Min | Max | Combined | Min | Max | Upper Percentage for Bin |
|---|---|---|---|---|---|---|---|---|---|---|
| Bin1 (1.1<=x<61.91) | 29 | 1.1 | 57.0 | 30 | 7.2 | 58.7 | 59 | 1.1 | 58.7 | 59% |
| Bin2 (61.91<=x<74.07) | 2 | 63.0 | 71.9 | 8 | 65.2 | 72.9 | 10 | 63.0 | 72.9 | 69% |
| Bin3 (74.07<=x<86.22) | 8 | 74.7 | 85.5 | 4 | 80.0 | 85.2 | 12 | 74.7 | 85.5 | 81% |
| Bin4 (86.22<=x<=98.4) | 11 | 87.1 | 98.4 | 8 | 88.0 | 97.8 | 19 | 87.1 | 98.4 | 100% |

Fig. 6C

| Bins | Server1 | Min | Max | Server2 | Min | Max | Combined | Min | Max | Upper Percentage for Bin |
|---|---|---|---|---|---|---|---|---|---|---|
| Pre-Bin (1.1<=x<74.7) | NR | NR | NR | NR | NR | NR | 69 | 1.1 | 74.7 | 69% |
| Bin3.1 (74.7<=x<81.45) | 3 | 74.7 | 77.5 | 1 | 80.0 | 80.0 | 4 | 76.5 | 80.0 | 73% |
| Bin3.2 (81.45<=x<82.8) | 0 | NR | NR | 0 | NR | NR | 0 | NA | NA | 73% |
| Bin3.3 (82.8<=x<84.15) | 1 | 83.1 | 83.1 | 1 | 83.1 | 83.1 | 2 | 83.1 | 83.1 | 75% |
| Bin3.4 (84.15<=x<=85.5) | 3 | 84.2 | 85.5 | 2 | 84.9 | 85.2 | 5 | 84.2 | 85.5 | 80% |

SERVER 1

Amendment I

Congress shall make no law respecting an establishment of religion, or prohibiting the free exercise thereof, or abridging the freedom of speech, or of the press; or the right of the people peaceably to assemble, and to petition the Government for a redress of grievances.

Amendment II

A well regulated Militia, being necessary to the security of a free State, the right of the people to keep and bear Arms, shall not be infringed.

Amendment III

No Soldier shall, in time of peace be quartered in any house, without the consent of the Owner, nor in time of war, but in a manner prescribed by law.

Amendment IV

The right of the people to be secure in their persons, houses, papers, and effects against unreasonable searches and seizures, shall not be violated, and no Warrents shall issue, but upon probable cause, supported by Oath or affirmation, and particularly describing the place to be searched, and the persons or things to be seized.

Amendment V

No person shall be held to answer to a capital, or otherwise infamous crime, unless on a presentment or indictment of a Grand Jury, except in cases arising in the land or naval forces, or in the Militia, when in actual service in time of War or public danger; nor shall any person be subject for the same offence to be twice put in jeopardy of life or limb; nor shall be compelled in any criminal case to be a witness against himself, nor be deprived of life, liberty, or property, without due process of law; nor shall private property be taken for public use, without just compensation.

SERVER 2

Amendment VI

In all criminal prosecutions, the accused shall enjoy the right to a speedy and public trial, by an impartial jury of the State and district wherein the crime shall have been committed, which district shall have been previously ascertained by law, and to be informed of the nature and cause of the accusation; to be confronted with the witness against him; to have compulsory process for obtaining witnesses in his favor, and to have the Assistance of Counsel for his defense.

Amendment VII

In Suits at common law, where the value of controversy shall exceed twenty dollars, the right of trial by jury shall be preserved, and no fact tried by a jury, shall be otherwise re-examined in any Court of the United States, than according to the rules of the common law.

Amendment VIII

Excessive bail shall not be required, nor excessive fines imposed, nor cruel and unusual punishment inflicted.

Amendment IX

The enumeration in the Constitution, of certain rights, shall not be construed to deny or disparage others retained by the people.

Amendment X

The powers not delegated to the United States by the Constitution, nor prohibited by it to the States, are reserved to the States respectively, or to the people.

| | Server1 | Server2 | Combined Result |
|---|---|---|---|
| Minimum | a | a | a |
| Maximum | witness | witnesses | witnesses |
| Count | 266 | 196 | 462 |

Fig. 8B

| Bin Counts (min, max) | Server A1 Count (left bound, right bound) | Server A2 Count (left bound, right bound) | Combined Result Count (left bound, right bound) | Cumulative Sum |
|---|---|---|---|---|
| Bin 1 'a' <= x < 'g' | 74 (a, freedom) | 69 (a, for) | 143 (a, freedom) | 143 |
| Bin 2 'g' <= x < 'l' | 27 (government, keep) | 21 (have, jury) | 48 (governmnet, keep) | 191 |
| Bin 3 'l' <= x < 'r' | 85 (land, quartered) | 34 (law, punishments) | 119 (land, quartered) | 310 |
| Bin 4 'r' <= x <= 'witnesses' | 80 (redress, witness) | 70 (re-examined, with) | 150 (re-examined, witness) | 460 (witnesses appears 2 times) |

810 812 814 816 818

| Bin Counts (min, max) | Server A1 Count (left bound, right bound) | Server A2 Count (left bound, right bound) | Combined Result Count (left bound, right bound) | Cumulative Sum |
|---|---|---|---|---|
| Bin 1.2 'a'<=x<'b' | 28 (a, assemble) | 20 (a, at) | 48 (a, at) | 48 |
| Bin 2.2 'b'<=x<'d' | 30 (be, criminal) | 32 (bail, cruel) | 62 (bail, cruel) | 110 |
| Bin 1.3 'd'<=x<'e' | 4 (danger, due) | 7 (defense, dollars) | 11 (danger, due) | 121 |
| Bin 1.4 'e'<=x<'Freedom' | 11 (effects, free) | 10 (enjoy, for) | 21 (effects, free) | 142 |

Fig. 8C

| Bin Counts (min, max) | Server A1 Count (left bound, right bound) | Server A2 Count (left bound, right bound) | Combined Result Count (left bound, right bound) | Cumulative Sum |
|---|---|---|---|---|
| Bin 1.2.1 'bail'<=x<'bl' | 16 (be, being) | 9 (bail, been) | 25 (bail, being) | 73 |
| Bin 1.2.2 'bl'<=x<'bw' | 2 (but, but) | 0 (N/A) | 2 (but, but) | 75 |
| Bin 1.2.3 'bw'<=x<'cg' | 6 (by, cause) | 9 (by, certain) | 15 (by, certain) | 90 |
| Bin 1.2.4 'cg'<=x<'cruel' | 6 (compelled, criminal) | 13 (committed, criminal) | 19 (committed, criminal) | 109 |

*Fig. 8D*

| Bin Counts (min, max) | Server A1 Count (left bound, right bound) | Server A2 Count (left bound, right bound) | Combined Result Count (left bound, right bound) | Cumulative Sum |
|---|---|---|---|---|
| Bin 1.2.4.1 'committed' <= x < 'cpet' | 4 (compelled, consent) | 11 (committed, court) | 15 (committed, court) | 105 |
| Bin 1.2.4.2 'cpet' <= x < 'cpya' | 0 (N/A) | 0 (N/A) | 0 (N/A) | 0 |
| Bin 1.2.4.3 'cpya' <= x < 'cqqf' | 0 (N/A) | 0 (N/A) | 0 (N/A) | 0 |
| Bin 1.2.4.4 'cqqf' <= x < 'criminal' | 1 (crime, crime) | 1 (crime, crime) | 2 (crime, crime) | 107 |

Fig. 8E

SYSTEMS AND METHODS FOR QUANTILE ESTIMATION IN A DISTRIBUTED DATA SYSTEM

FIELD

The technology described in this patent document relates generally to computer-implemented.

BACKGROUND

Quantiles are commonly used for various applications involving frequency data. Finding quantiles of a variate in small data sets is a relatively simple matter. As the number of observed values in the data set increases, however, the quantile problem becomes more difficult. Further complicating the problem is that large data sets are often stored in distributed systems in which different components (e.g., nodes) of the system have access to different portions of the data.

SUMMARY

In accordance with the teachings described herein, systems and methods are provided for estimating quantiles for data stored in a distributed system. In one embodiment, an instruction is received to estimate a specified quantile for a variate in a set of data stored at a plurality of nodes in the distributed system. A minimum data value and a maximum data value for the variate are identified from the set of data. A plurality of data bins for the variate is defined, wherein the plurality of data bins collectively range from the minimum data value to the maximum data value and each of the plurality of data bins is associated with a different range of data values in the set of data. A total number of data values in the set of data that fall within each of the plurality of data bins is determined. Lower and upper quantile bounds for each of the plurality of data bins are determined based on the total number of data values that fall within each of the plurality of data bins. One of the plurality of data bins is identified that includes the specified quantile based on the lower and upper quantile bounds. The specified quantile is estimated based on the identified one of the plurality of data bins.

BRIEF DESCRIPTION OF THE DRAWINGS

FIGS. 4-8E depict examples of how quantiles may be estimated using the systems and methods described herein.

DETAILED DESCRIPTION

Figure 1:
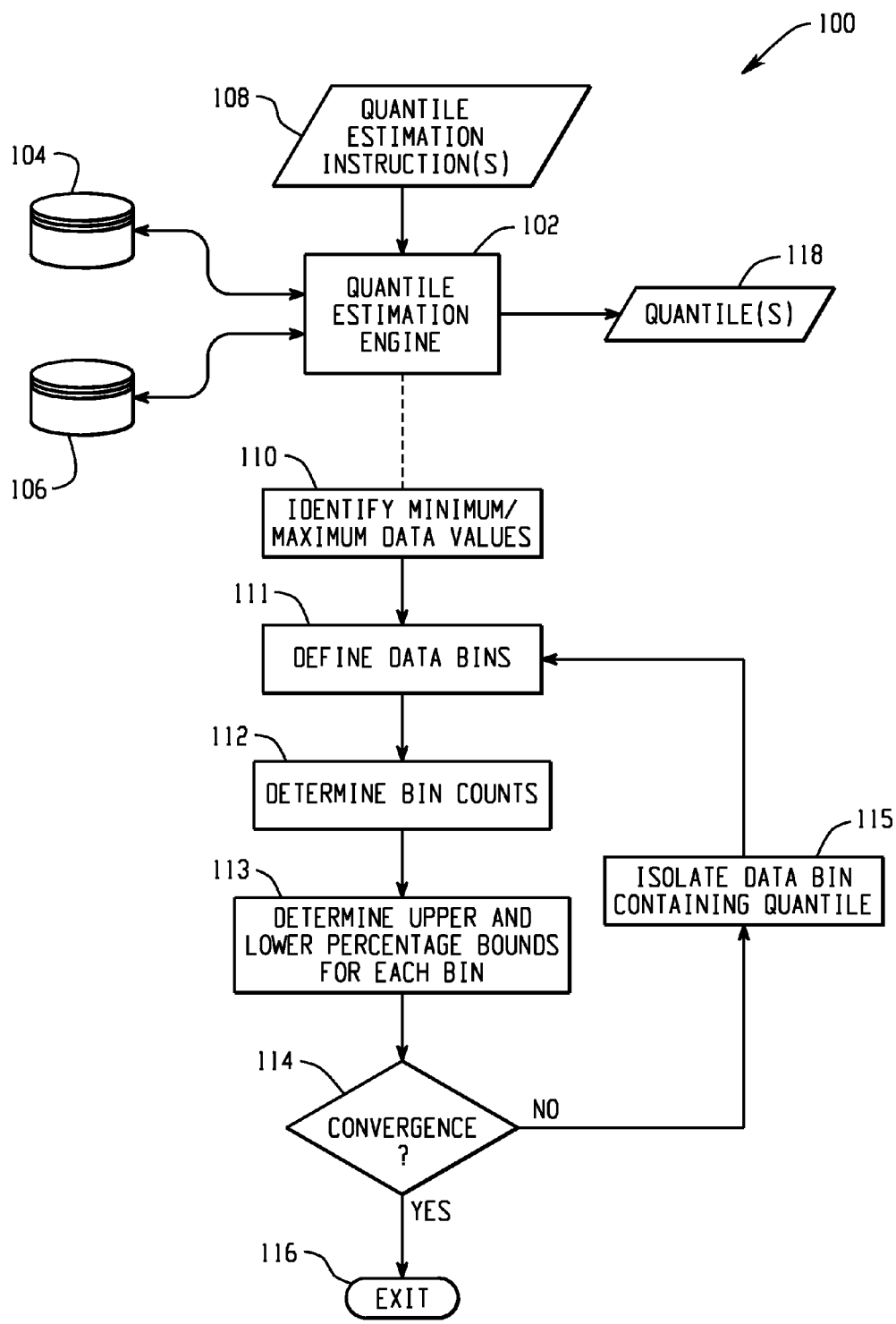
FIG. 1 is a block diagram of an example system for estimating quantiles for data stored in a distributed system.

FIG. 1 is a block diagram of an example system 100 for estimating quantiles for data stored in a distributed system. The system 100 includes a quantile estimation engine 102 that executes in a distributed system in which data is stored in a plurality of separate files at different nodes 104, 106 in the distributed system. As used herein, a distributed system consists of a plurality of separate computers and/or databases that are connected together through a network, and a node in the distributed system may include any one of the computers or databases in the distributed system. Typically, the nodes of a distributed system are connected using middleware such that the entire distributed system appears to a user as a single, integrated computing system. In the example illustrated in FIG. 1, the data of interest is stored in files at two separate nodes 104, 106 of the distributed system. The quantile estimation engine 102 may, for example, be a software application that is executed by a processor located either at nodes 104 or 106 or at a separate node in the distributed system. It should be understood that although two nodes are shown in the examples illustrated in FIGS. 1-3, a distributed system may include data stored in files located in more than two nodes.

In operation, the quantile estimation engine 102 receives an instruction 108 that identifies a quantile to be estimated for a variate in a set of data stored in a plurality of files at separate nodes 104, 106 in the distributed system. The quantile estimation instruction 108 may, for example, be received from user input or from another software module in the system.

Upon receiving the quantile estimation instruction 108, the system 100 executes the processes depicted at 110-116 in FIG. 1 in order to generate the quantile estimate 118 for the set of data. It should be understood that the steps of the method depicted in FIG. 1 may be performed entirely by the quantile estimation engine 102 or, alternatively, the quantile estimation engine 102 may cause one or more steps or portions of one or more steps to be performed by other nodes 104, 106 of the distributed system.

At 110, the system 100 performs a single pass through the set of data to determine the minimum and maximum values for the variate. At 111, the quantile estimation engine 102 defines a plurality of data bins for the variate. The data bins for a variate collectively range from the minimum data value to the maximum data value for the variate in the set of data, with each data bin being associated with a different range of data values in the set of data.

At 112, the system 100 performs another pass through the set of data to determine a count of the total number of data values for the variate that fall within each of the plurality of data bins. From the bin counts, the quantile estimation engine 102 determines, at 113, the upper and lower bounds on the percentages for each of the plurality of data bins. At 114, the quantile estimation engine 102 determines if one of the plurality of data bins has converged on the quantile specified in the quantile estimation instruction 108. For example, the quantile estimation engine 102 may be configured to estimate the quantile 118 to a predetermined level of precision. The level of precision may, for example, be based on the absolute error bound for quantiles in the bin. For instance, if the specified quantile is between the upper and lower quantile bounds for a bin and the absolute error (e.g., calculated as half the distance between the upper and lower bounds) is within the predetermined precision level, then the quantile estimation engine 102 may estimate the quantile 118 from the data values within the bin. For example, the quantile estimate 118 may be selected from a data value at the midpoint of the bin or as a weighted average of the data values in the bin.

If one of the plurality of data bins has not converged on the specified quantile, then, at 115, the quantile estimation engine 102 isolates one of the plurality of bins that includes the specified quantile. The method then returns to 111, where the quantile estimation engine 102 defines a new set of data bins that collectively range from the lower to upper quantile bounds of the isolated bin. The method then repeats steps 112 and 113 to make another pass through the data set with the redefined data bins. This process is repeated until a data bin converges on the specified quantile (possibly within a predetermined precision level), at which point the quantile estimate 118 is provided and the quantile estimation method ends at 116.

Figure 2:
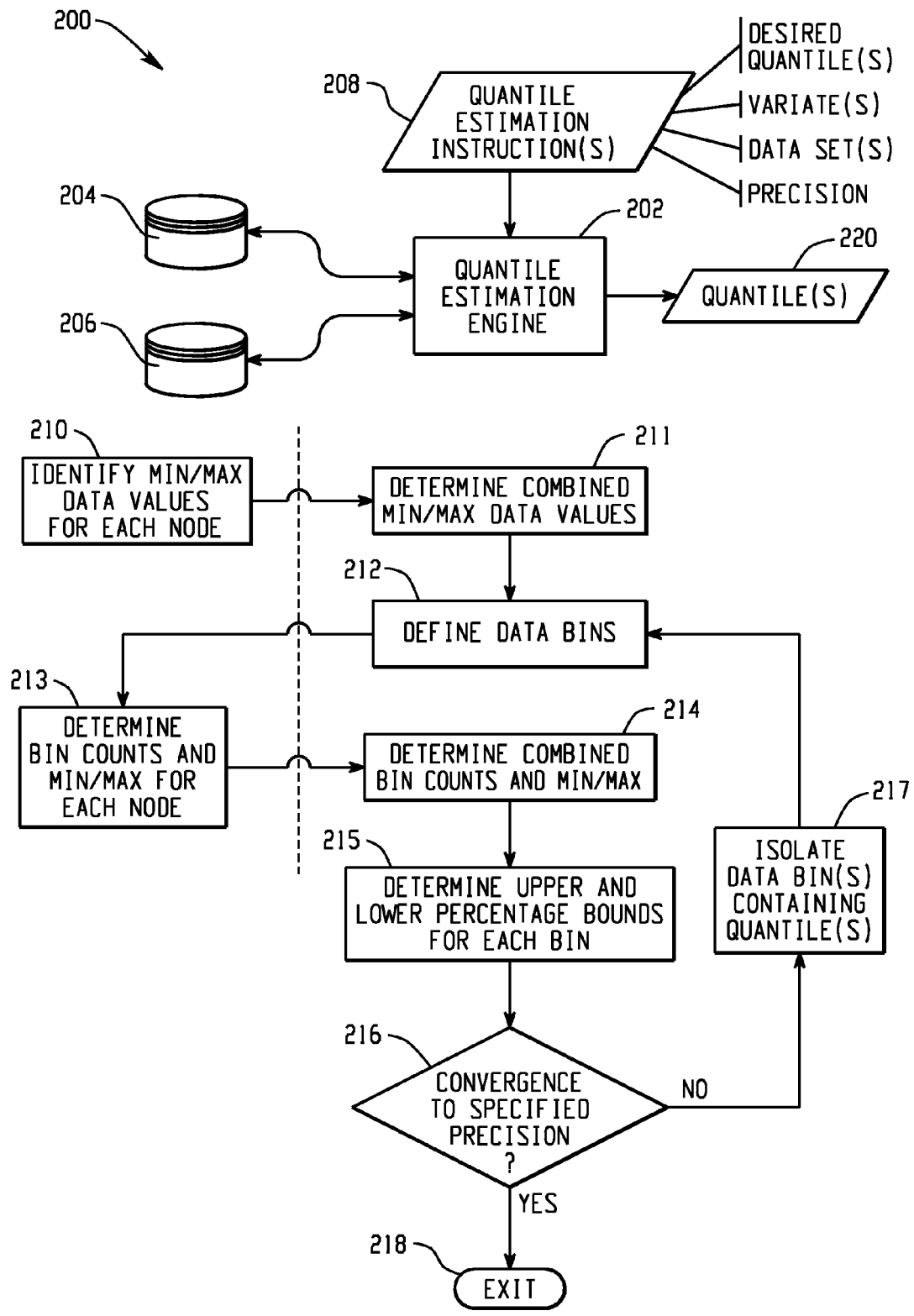
FIG. 2 is a block diagram of another example system 200 for estimating quantiles for data stored in a distributed system 200 in which data is stored in a plurality of separate files at different nodes 204, 206 in the distributed system.

FIG. 2 is a block diagram of another example system 200 for estimating quantiles for data stored in a distributed system 200 in which data is stored in a plurality of separate files at different nodes 204, 206 in the distributed system. In this example, instructions 208 received by the quantile estimation engine 202 may specify a single quantile for estimation or may specify multiple quantiles (e.g., a vector of quantiles) for estimation. As explained below, if multiple quantiles for a set of data are specified for estimation, then the quantile estimation engine 202 may simultaneously determine quantile estimates for each of the multiple quantiles. In addition, the quantile estimate engine 202 may be configured to simultaneously estimate quantiles for multiple variates and data sets. The quantile estimation instructions 208 may therefore identify multiple variates and multiple data sets for quantile estimation.

Upon receiving the quantile estimation instruction(s) 208, the system 200 executes the processes depicted at 210-218 in FIG. 2 in order to generate the quantile estimate(s) 220. In this example 200, a dotted line 222 is included to illustrate processes that may be performed by the quantile estimation engine 202 and processes that may be performed at the distributed nodes 204, 206. Specifically, in the illustrated example, the processes depicted to the left of the dotted line 222 are performed by the distributed nodes 204, 206 and the processes depicted to the right of the dotted line 222 are performed by the quantile estimation engine 202.

At steps 210 and 211, the system 200 performs a single pass through the set(s) of data to determine the minimum and maximum values for each variate. At 210, each node 204, 206 that holds portions of the data for the identified variate(s) determines the maximum and minimum values of the variate (s) for its data and sends this information back to the quantile estimation engine 202. At 211, the quantile estimation engine 202 combines the data counts and minimum and maximum values from the distributed nodes 204, 206 to determine the counts, minimum and maximum values for the entire set(s) of data.

At 212, the quantile estimation engine 202 defines a plurality of data bins for each variate. The data bins for a variate collectively range from the minimum data value to the maximum data value for the set of data, with each data bin being associated with a different range of data values in the set of data. If the quantile estimation instructions 208 identify multiple variates and/or data sets, then a different plurality of data bins are defined for each variate and data set. In addition, if multiple quantiles are included in the quantile estimation instructions, then a different plurality of data bins may be defined for each quantile.

At steps 213 and 214, the system 200 performs another pass through the set(s) of data to determine the number of data values that fall within each of the plurality of data bins for each variate. At 213, each node 204, 206 performs frequency counts of the variate for its data and projects the frequency counts into each bin. If the quantile estimation instructions 208 identify multiple variates and/or data sets, then the nodes 204, 206 may perform frequency counts and obtain maximum and minimum values for each variate and/or data set during the same data pass. The nodes 204, 206 send the bin counts and minimum and maximum values to the quantile estimation engine 202 which, at 214, combines the bin counts from each of the nodes 204, 206 to determine the total bin counts for each variate. In addition, in this example, each node 204, 206 also identifies, at step 213, the minimum and maximum data values within each of the plurality of data bins for each variate and returns these minimum/maximum values to the quantile estimation engine 202, which combines the minima and maxima from each node 204, 206 at step 214. In this way, the combined minimum and maximum values for each bin may be used by the quantile estimation engine 202 to help identify the location of the desired quantile and potentially speed up the convergence process.

At 215, the quantile estimation engine 202 determines the upper and lower bounds on the percentages for each of the plurality of data bins based on the bin counts. The quantile estimation engine 202 may then determine, at 216, if one of the plurality of data bins has converged, to a predetermined precision level, on the quantile(s) specified in the quantile estimation instruction 208. As illustrated, the precision level necessary for convergence may, for example, be included in the quantile estimation instruction 208. If one of the plurality of data bins has not converged on the specified quantile(s), then, at 217, the quantile estimation engine 202 isolates one of the plurality of bins that includes the specified quantile(s), and returns to step 212 to define a new set of data bins that include the data values from the isolated bin. This process is repeated until a data bin converges on the specified quantile (s), at which point a quantile estimate 220 is determined from the data values in the bin, and the method ends at 218.

Figure 3:
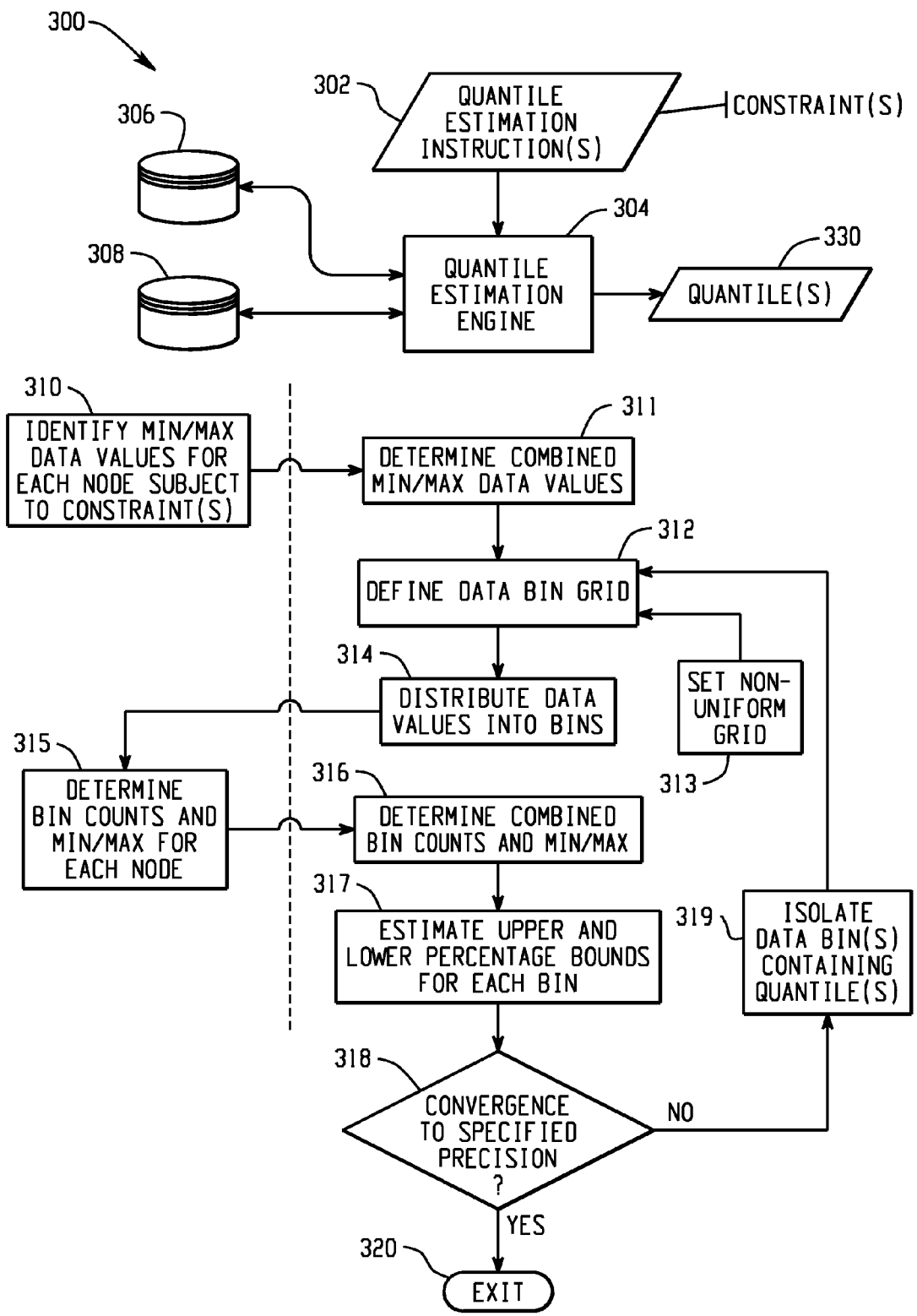
FIG. 3 is a block diagram of another example system 300 for estimating quantiles for data stored in a distributed system 300.

FIG. 3 is a block diagram of another example system 300 for estimating quantiles for data stored in a distributed system 300. In this example, the instructions 302 received by the quantile estimation engine 304 may also include one or more constraints to limit the data values included in the quantile estimation. For instance, the constraint(s) may limit the quantile estimation to one or more subcategories of data for the identified variate(s). As an example, the constraint(s) could limit the quantile estimation to data values for a variate from a certain geographic region, during a certain time period, or based on some other criteria. In addition, the example illustrated in FIG. 3 may establish non-uniform data bins, for instance to help speed up the convergence process.

In operation, the system 300 depicted in FIG. 3 executes the processes depicted at steps 310-319 upon receiving the quantile estimation instruction(s) 302. Again in this example 300, a dotted line 332 is included to illustrate processes that may be performed by the quantile estimation engine 304 (depicted to the right of the dotted line) and processes that may be performed at the distributed nodes 306, 308 (depicted to the left of the dotted line).

At steps 310 and 311, the system 300 performs a single pass through the set(s) of data to determine the minimum and maximum values for each variate, subject to any constraints identified in the quantile estimation instructions 302. Specifically, at 310, each node 306, 308 that holds portions of the data for the identified variate(s) determines the maximum and minimum values of the variate(s) for its data, subject to any constraints, and sends this information back to the quantile estimation engine 304. For example, if the quantile estimation instruction 302 includes a constraint that identifies a particular geographic region, then each node 306, 308 determines the minimum and maximum values of the variate(s) within its data that are associated with the identified geographic region. At 311, the quantile estimation engine 304 combines the data counts from the distributed nodes 306, 308 to determine the minimum and maximum values for the entire set(s) of data.

At 312, the quantile estimation engine 304 defines a grid size and distribution for a plurality of data bins for each variate. A grid for a set of data bins, as used herein, is the set of points that define the bounds of the data bins. That is, a set of data bins for a variate collectively include the data values between a minimum value and a maximum value. The set of points between the minimum and maximum values that define the bounds of each bin are referred to as the grid, where the grid size refers to the number of points in the grid and the grid distribution refers to where each of the set of grid points are located. (See, e.g., the examples described below with reference to FIGS. 4-8E). A grid for a set of data bins may be uniform or non-uniform. A non-uniform grid may, for example, be defined based on some known or calculated information regarding the likely position of the desired quantile within the data. For example, a non-uniform grid may be based on information obtained from a previous data pass (e.g., while isolating a data bin at 319.) In another example, a non-uniform data grid may be established by applying a known quantile algorithm, such as conformal mapping, and using the resultant data to include likely quantile values in the same bin. In another example, a non-uniform grid distribution may be used to isolate one or more outlier data values. In the example illustrated in FIG. 3, one or more of these processes to define a non-uniform grid may be performed at process step 313. Once the grid is defined, the data values are distributed into the plurality of bins at 314.

At steps 315 and 316, the system 300 performs another pass through the set(s) of data to determine the number of data values that fall within each of the plurality of data bins for each variate, along with the minimum and maximum data values within each bin. At 315, each node 306, 308 performs frequency counts of the variate and projects the frequency counts into each bin. Each node 306, 308 also determines the minimum and maximum data values in each of the plurality of bins for each variate. The nodes 306, 308 then send the bin counts and the minimum and maximum values to the quantile estimation engine 304, which combines them at 316 to determine total bin counts and minimum/maximum values for each variate At 317, the quantile estimation engine 304 determines the upper and lower bounds on the percentages for each of the plurality of data bins based on the bin counts. The quantile estimation engine 304 may then determine, at 318, if one of the plurality of data bins has converged (e.g., to a predetermined precision level) on the specified quantile(s). If one of the plurality of data bins has not converged on the specified quantile(s), then, at 319, the quantile estimation engine 304 isolates one of the plurality of bins that includes the specified quantile(s), and returns to step 312 to define a new data grid that includes the data values from the isolated bin. This process is repeated until a data bin converges on the specified quantile(s), at which point a quantile estimate 330 is determined from the data values in the bin, and the method ends at 320.

Figure 4:
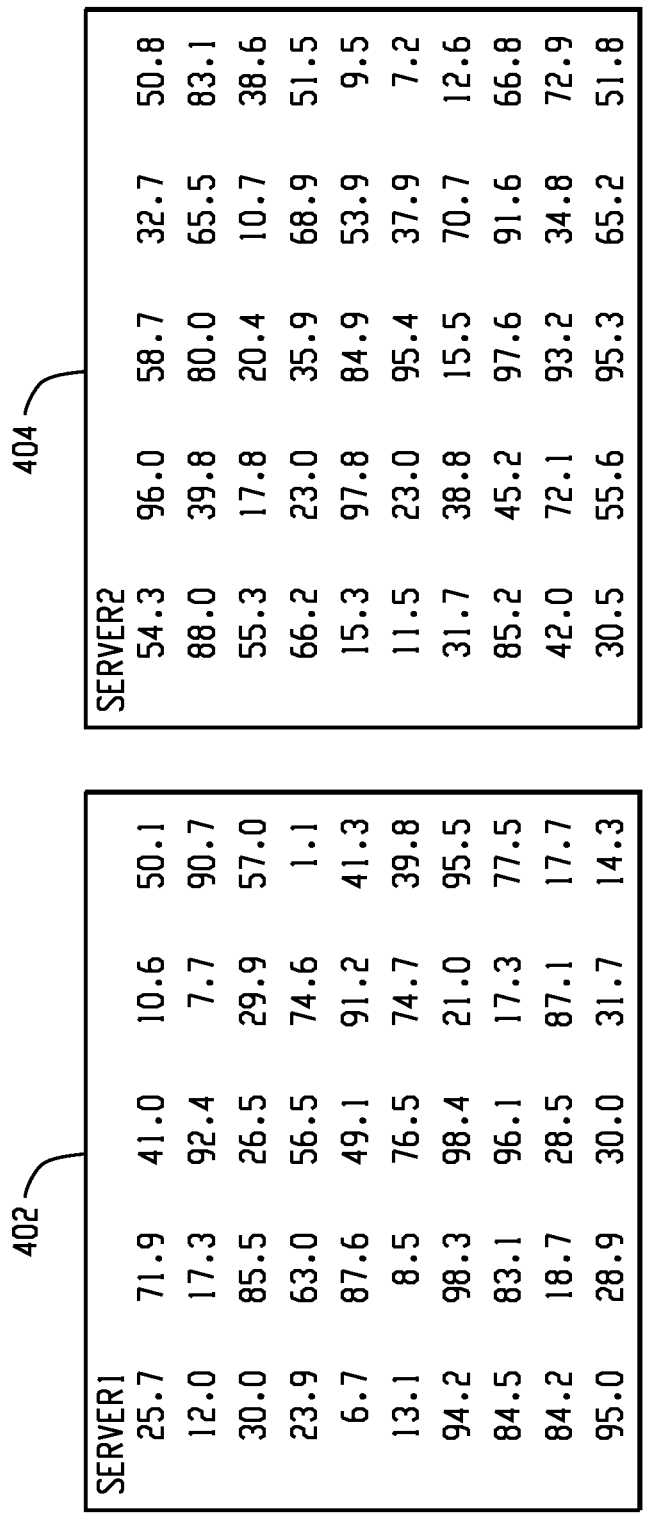

FIGS. 4-6C depict a first example of how a quantile may be estimated using the systems and methods described herein. FIG. 4 illustrates example data values for a variate that are split between two nodes (server 1 and server 2) 402, 404 in a distributed system. In this example, each data value represents an observed value for the same variate (the observations have been arranged in multiple columns for readability.) In total, the example includes 100 observed data values, with 50 observations stored at each of the two nodes 402, 404. The goal of the illustrated example is to estimate the 75% quantile for the example set of data shown in FIG. 4. The exact answer to this query is 83.1.

FIG. 5A illustrates an example of data that may be obtained from a first pass through the data shown in FIG. 4. As illustrated, the first node (server 1) determines that its stored data for the variate includes a count of 50 data values with a minimum data value of 1.1 and a maximum data value of 98.4. The second node (server 2) in the illustrated example determines that its stored data for the variate includes a count of 50 data values with a minimum data value of 7.2 and a maximum data value of 97.8. As shown, combined results may be determined (e.g., by a centralized node) from the data from the first and second nodes. In the illustrated example, the combined results include a total of 100 data values with a minimum value of 1.1 and a maximum value of 98.4.

FIG. 5B illustrates an example of how data bins may be defined based on the minimum and maximum data values and how bin counts may be determined from a second pass through the data shown in FIG. 4. In this example, the data bins are defined with a grid size of 3 and with a uniform distribution. Equally spacing 3 points (rounded to 2 decimal places) between the minimum (1.1) and the maximum (98.4) data values, results in grid points of 25.45, 49.76 and 74.07. This results in four data bins, as illustrated in column 502 in FIG. 5B. In a second pass through the data, the distributed nodes (server 1 and server 2) perform a count of the number of data values and the minimum and maximum values in each bin and return the results to the centralized node (e.g., the quantile estimation engine), as illustrated in columns 504 and 506. The centralized node then combines the results, as illustrated in column 508, and determines the quantile bounds for each bin, as shown in column 510. For instance, in the illustrated example, the upper quantile bound for Bin 1 represents the 25% quantile [Bin 1 Count (25)/Total Count (100)], the upper quantile for Bin 2 represents the 48% quantile [Sum of Bin 1 and 2 Counts (25+23)/Total Count (100)], and so on. From this information, the centralized node can determine that the desired 75% quantile must be included within Bin 4, which has a lower quantile bound representing the 69% quantile and an upper bound representing the 100% quantile. If the data range within Bin 4 meets the desired level of precision, then a quantile estimate may be determine from the information shown in FIG. 5B. For example, the value at the midpoint of Bin 4 (74.07≤x≤98.4) may be selected, resulting in an estimated 75% quantile of 86.24. However, if greater precision is desired, then Bin 4 may be further refined into a new set of data bins, as illustrated in FIG. 5C.

In FIG. 5C, the data from the isolated bin (Bin 4) is separated into four new uniform bins (Bins 4.1-4.4), as shown in col. 512. In a third pass, the distributed nodes (server 1 and server 2) perform a count of the data values in each of the redefined bins and return the results to the centralized node, as illustrated in columns 514 and 516. The counts are then combined, as shown in column 518, and the quantile bounds for each bin are calculated, as shown in column 520. The centralized node may now isolate the desired 75% quantile to Bin 4.2, which has a lower bound of 80.14 and an upper bound of 86.22. The actual quantile may reside anywhere within Bin 4.2. The midpoint of the bin, 83.18, may be selected as the estimated 75% quantile, or further iterations could be performed to refine the estimate. In this example, each added iteration would reduce the error by a factor of at least ¼.

FIG. 6A-6C illustrate another example using the data from FIG. 4, but with a non-uniform grid. Again, the goal of the example is to estimate the 75% quantile for the data in FIG. 4. FIG. 6A illustrates the minimum and maximum data values obtained from a first pass through the data, which is the same as in the uniform grid example shown in FIG. 5A. A non-uniform grid is then established, which for this example includes grid points at 62.5%, 75% and 87.5% of the distance from the lower bin value to the upper bin value. These grid points may, for example, have been selected to cluster the bins around where the desired 75% quantile should be located if the distribution was uniform. The resulting non-uniform bins (Bin1-Bin4) are illustrated in column 602 of FIG. 6B.

In a second pass through the data, the distributed nodes (server 1 and server 2) perform a count of the number of data values and minimum and maximum values in each bin and return the results to the centralized node, as illustrated in columns 604 and 606. The centralized node then combines the results, as illustrated in column 608, and determines the quantile bounds for each bin, as shown in column 610. FIG. 6B also tracks the minimum and maximum values within each bin, which may, for example, be used in the creation of a non-uniform grid to narrow the span of bins generated in further iterations.

From this information, the centralized node can determine that the desired 75% quantile must be included within Bin 3, which has a lower quantile bound of 74.07% and an upper bound of 85.5. If the data range within Bin 3 meets the desired level of precision, then a quantile estimate may be determine from the information shown in FIG. 6B. For example, the value at the mid-point of Bin 3 ($74.07 \leq x \leq 86.22$) may be selected, resulting in an estimated 75% quantile of 80.15. However, if greater precision is desired, then Bin 3 may be further refined into a new set of data bins, as illustrated in FIG. 6C.

In FIG. 6C, the data from the isolated bin (Bin 3) is separated into four uniform bins (Bins 3.1-3.4), as shown in col. 612. In other examples, however, information regarding the likely position of the quantile within the isolated bin could be used to separate the isolated bin into another non-uniform set of data bins. In a third pass, the distributed nodes (server 1 and server 2) perform a count of the data values in each of the redefined bins and return the results to the centralized node, as illustrated in columns 614 and 616. The counts are then combined, as shown in column 618, and the quantile bounds for each bin are calculated, as shown in column 620. In the illustrated example, the process has converged on the exact 75% quantile of 83.1, located in Bin 3.3.

FIGS. 7-8E depict another example in which the data of interest is non-numerical. In this example, the data of interest is the text of the U.S. Bill of Rights, which is stored at two separate nodes (server 1 and server 2) in a distributed system, as illustrated in FIG. 7. Specifically, the text from Amendments I-V is stored in a file located at a first node (server 1) 702 and the text from Amendments VI-X is stored in a file located at a second node (server 2) 704. This example finds the 23% quantile of the words in the Bill of Rights. That is, the example determines the word that appears in the Bill of Rights that follows alphabetically 23% of all words appearing in the Bill of Rights.

It should be understood that there is a technicality involved with character data that isn't involved with numerical data. Depending on the number of datum, there may not be a datum for which 23% of the total data are less. Consider, for instance, the following example:

Data={1, 2, 3, 4, 5, 6, 7, 8, 9, 10}, Desired quantile=23%. In this data set, 20% of the data is less than or equal to 2, 30% of the data is less than or equal to 3. In practice, some systems report the 23% quantile to be 2, some report 3, some report the average 2.5, others report an interpolated value 2.3, and still others report some other interpolated number between 2 and 3.

Interpolation of character data typically does not give meaningful results. Instead, one or the two words adjacent to the desired percentile are reported. The character equivalent to the numerical example set forth above is:

Data={a, b, c, d, e, f, g, h, i, j}, Desired quantile=23%. The answer to this example could be either 'b' or 'c'.

To create the data bin boundaries for character data, a scheme may be used to interpolate character data. The bin boundaries will not be meaningful words under the interpolation scheme. However, the maximum and minimum words (alphabetically) may be stored for each bin.

FIG. 8A illustrates the minimum and maximum words obtained from a first pass through the data. As shown, the first node (server 1) determines that its stored data includes a count of 266 words with a minimum word (alphabetically) of "a" and a maximum word of "witness." The second node (server 2) in the illustrated example determines that its stored data includes a count of 196 words with a minimum word of "a" and a maximum word of "witnesses." As illustrated, the combined results may then be determined (e.g., by a centralized node), resulting in a combined total of 462 words with a minimum of "a" and a maximum of "witnesses." With a total of 462 words in the stored data, the example is looking for word number 462*0.23=106.26, to locate the 23% quantile. The example will therefore report words 106 and 107.

In one example, to create the bin points for the character data each word may be mapped to an integer. This may be accomplished, for example, by locating the longest word in the data (in this case "establishment" with 13 letters) and consider each word as a number, in base 26, created by left justifying the word with a=0, b=1, c=2, . . . , z=25. This reduces the bin creating process to the same problem as the numerical examples.

To reduce the number of comparisons, a minimum number of alphabetic digits may be determined in order to arrive at a desired number of distinct bins. For instance, to provide 3 bin boundaries between 'a' and 'witnesses', bins are only necessary between 'a'=0 and 'w'=22. The 25% bin boundary would therefore be (22−0)*0.25=5.5 (between 'f' and 'g', which we can round to 'g'); the 50% bin boundary would be (22−0)*0.5=11 (T), and the 75% bin boundary would be (22−0)*0.75=16.5 (between 'q' and 'r', which rounds to 'r'). These resulting bins are illustrated in FIG. 8B, at column 810.

In a second pass through the data, the distributed nodes (server 1 and server 2) perform a count of the number of data values in each bin along with the minimum and maximum data values, as shown in columns 812 and 814 of FIG. 8B. The centralized node then combines the results, as illustrated in column 816, and determines the cumulative sum for each bin, as shown in column 818. In the illustrated example, the cumulative sum of the first bin is 143, therefore the desired quantile is located in Bin 1 between the words 'a' and 'freedom.' Bin 1 may then be divided into a new set of data bins to further isolate the desired quantile, as illustrated in FIG. 8C.

In FIG. 8C, the data from the isolated bin (Bin 1) is separated into four new bins (Bins 1.1-1.4), as shown at column 820. In a third data pass, the distributed nodes (server 1 and server 2) determine a data count and minimum/maximum data values in each of the redefined bins, and return the results to the centralized node, as illustrated in columns 822 and 824. The counts are then combined, as shown in column 826, and the cumulative sum for each bin is determined, as shown in column 828. In this example, the cumulative sum of the first two bins is 110, therefore the desired quantile is located in Bin 1.2 between the words 'bail' and cruel.' To further isolate the quantile, Bin 1.2 may be separated into four more bins, as shown in FIG. 8D.

In FIG. 8D, the data from the isolated bin (Bin 1.2) is separated into four new bins (Bins 1.2.1-1.2.4), as shown at column 830. In a fourth data pass, the distributed nodes (server 1 and server 2) determine a data count and minimum/ maximum data values in each of the redefined bins, and return the results to the centralized node, as illustrated in columns 832 and 834. The counts are then combined, as shown in column 836, and the cumulative sum for each bin is determined, as shown in column 838. From this information, it can be seen that the quantile is located in Bin 1.2.4 between the words 'committed' and criminal.' To further isolate the quantile, Bin 1.2.4 may be separated into four more bins, as shown in FIG. 8E.

In FIG. 8E, the data from the isolated bin (Bin 1.2.4) is separated into four new bins (Bins 1.2.4.1-1.2.4.4), as shown at column 840. In a fifth data pass, the distributed nodes (server 1 and server 2) determine a data count and minimum/maximum data values in each of the redefined bins, and return the results to the centralized node, as illustrated in columns 842 and 844. The counts are then combined, as shown in column 846, and the cumulative sum for each bin is determined, as shown in column 848. In the illustrated example, the process has converged on the desired 23% quantile (i.e., the $106^{th}$ or $107^{th}$ word alphabetically) in Bin 1.2.4.4, which is the word 'crime'.

Figure 9:
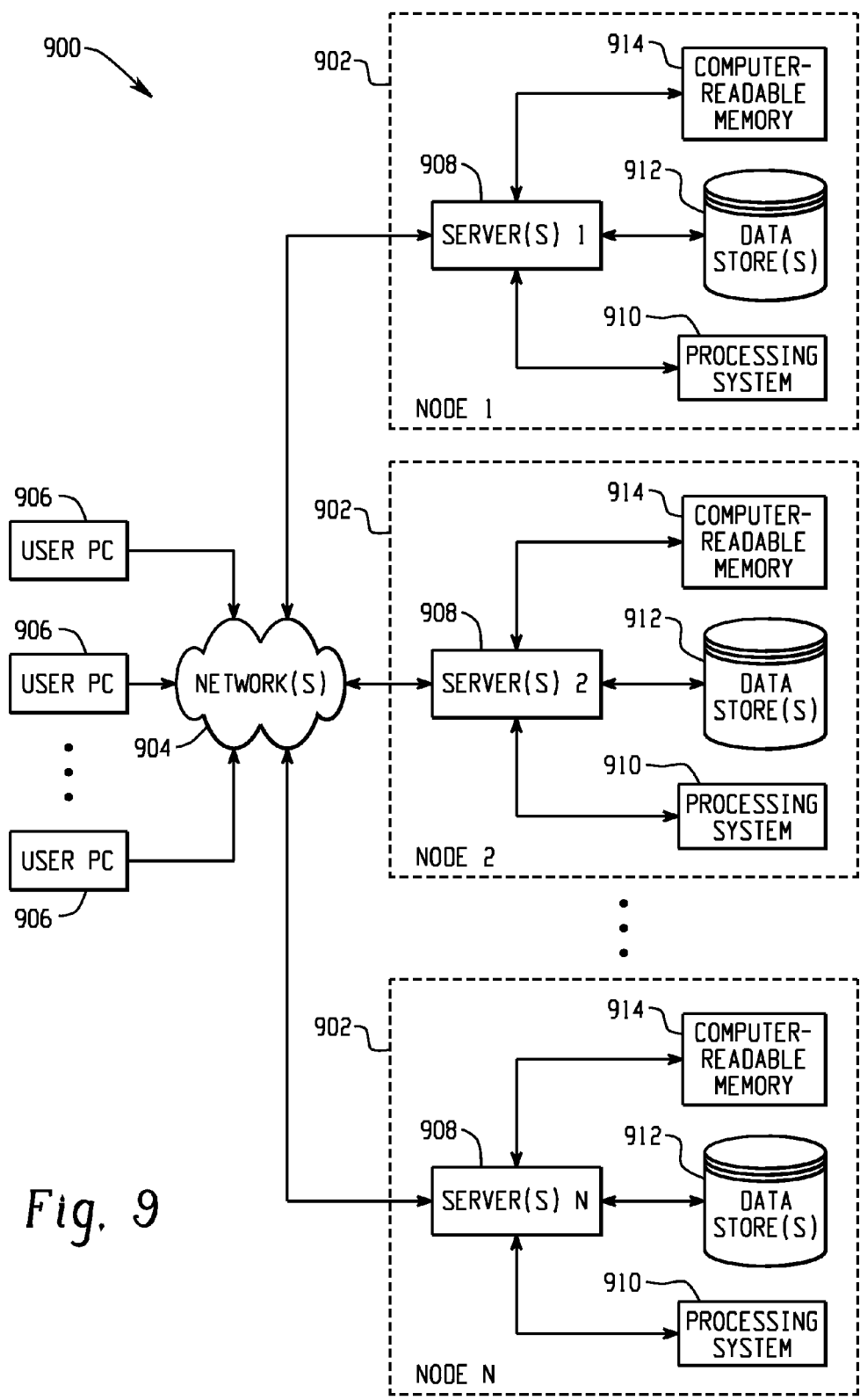
FIG. 9 depicts an example of a distributed system that may be used for estimating quantiles.

FIG. 9 depicts an example of a distributed system 900 that may be used for estimating quantiles. The distributed system 900 includes a plurality of nodes 902 that are connected together though one or more networks 904 and which may be accessed over the network(s) 904 by one or more computers or network terminals 906. Each node 902 may include one or more servers 908 executing data storage and retrieval software on a processing system 910. Each node 902 may also include one or more data stores 912 and/or computer readable medium 914. One of the nodes 902 may, for example, be a centralized node that executes a quantile estimation engine, as described herein. In addition, the nodes 902 of the distributed system 900 may be connected using middleware (not shown) such that the entire distributed system 900 appears to a user as a single, integrated computing system.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for estimating quantiles for data stored in a distributed system, comprising:
   receiving an instruction to estimate a specified quantile for a variate in a set of data stored at a plurality of nodes in the distributed system;
   identifying a minimum data value and a maximum data value for the variate from the set of data;
   defining a plurality of data bins for the variate, wherein the plurality of data bins collectively range from the minimum data value to the maximum data value and each of the plurality of data bins is associated with a different range of data values in the set of data;
   determining a total number of data values in the set of data that fall within each of the plurality of data bins;
   determining lower and upper quantile bounds for each of the plurality of data bins based at least in part on the total number of data values that fall within each of the plurality of data bins;
   identifying one of the plurality of data bins that includes the specified quantile based on the lower and upper quantile bounds;
   estimating the specified quantile based on the identified one of the plurality of data bins; and
   storing data including the estimated specified quantile and the upper and lower quantile bounds, wherein when another plurality of data bins is defined, the stored data is used to narrow one or more spans of lower and upper quantile bounds of the another plurality of data bins;
   wherein the operations of the method are performed by one or more hardware processors in the distributed system.

2. The method of claim 1, further comprising:
   determining a total minimum data value and a total maximum data value within each of the plurality of data bins;
   wherein the one of the plurality of data bins that includes the specified quantile is identified based also on the total minimum data value and the total maximum data value in the one of the plurality of data bins.

3. The method of claim 2, further comprising:
   determining a number of data values in each of the plurality of nodes that fall within each of the plurality of data bins;
   determining a minimum and maximum data value in each of the plurality of nodes that fall within each of the plurality of data bins;
   obtaining the number of data values in each of the plurality of nodes to determine the total number of data values that fall within each of the plurality of data bins;

obtaining the minimum data values from each of the plurality of nodes to determine the total minimum data value for each of the plurality of data bins; and summing the maximum data values from each of the plurality of nodes to determine the total maximum data value for each of the plurality of data bins.

4. The method of claim 1, wherein a vector of quantiles are simultaneously estimated for the variate.

5. The method of claim 1, wherein the instruction identifies one or more constraints, and the quantile is estimated subject to the identified one or more constraints.

6. The method of claim 1, further comprising:

defining a second plurality of data bins, wherein each of the second plurality of data bins is associated with a different range of data values within the identified one of the plurality of data bins;

determining a total number of data values in the set of data that fall within each of the second plurality of data bins;

determining lower and upper quantile bounds for each of the second plurality of data bins based on the total number of data values that fall within each of the second plurality of data bins;

identifying one of the second plurality of data bins that includes the specified quantile based on the lower and upper quantile bounds for the second plurality of data bins; and estimating the specified quantile based on the identified one of the second plurality of data bins.

7. The method of claim 6, further comprising:

repeating the operations of claim 5, each time with a new plurality of data bins covering a narrower range of data values, until one of the data bins converges on the specified quantile.

8. The method of claim 1, wherein the plurality of data bins include an equidistant set of grid points.

9. The method of claim 1, wherein one or more of the plurality of data bins includes a non-uniform set of grid points.

10. The method of claim 9, wherein the non-uniform set of grid points is defined to isolate one or more outlying data values.

11. The method of claim 9, wherein the non-uniform set of grid points is defined based on a likely location of the specified quantile within the set of data.

12. A system for estimating quantiles for data stored in a distributed system, comprising:

a centralized node of the distributed system that includes one or more hardware processors and one or more computer readable mediums; and a plurality of distributed nodes in the distributed system, each distributed node including one or more additional hardware processors and one or more additional computer readable mediums;

the centralized node configured to receive an instruction to estimate a specified quantile for a variate in a set of data stored at the plurality of distributed nodes;

the plurality of distributed nodes configured to identify a minimum data value and a maximum data value for the variate from the set of data;

the centralized node further configured to define a plurality of data bins for the variate, wherein the plurality of data bins collectively range from the minimum data value to the maximum data value and each of the plurality of data bins is associated with a different range of data values in the set of data;

the plurality of distributed nodes further configured to determine a total number of data values in the set of data that fall within each of the plurality of data bins;

the centralized node further configured to:

determine lower and upper quantile bounds for each of the plurality of data bins based on the total number of data values that fall within each of the plurality of data bins, identify one of the plurality of data bins that includes the specified quantile based on the lower and upper quantile bounds, estimate the specified quantile based on the identified one of the plurality of data bins; and store data including the estimated specified quantile and the upper and lower quantile bounds, wherein when another plurality of data bins is defined, the stored data is used to narrow one or more spans of lower and upper quantile bounds of the another plurality of data bins.

13. The system of claim 12, wherein the centralized node is further configured to:

determine a total minimum data value and a total maximum data value within each of the plurality of data bins; and wherein the one of the plurality of data bins that includes the specified quantile is identified based also on the total minimum data value and the total maximum data value in the one of the plurality of data bins.

14. The system of claim 13, wherein:

the plurality of distributed nodes are further configured to:

determine a number of data values in each of the plurality of nodes that fall within each of the plurality of data bins, and determine a minimum and maximum data value in each of the plurality of nodes that fall within each of the plurality of data bins; and the centralized node is further configured to:

sum the number of data values in each of the plurality of nodes to determine the total number of data values that fall within each of the plurality of data bins, obtain the minimum data values from each of the plurality of nodes to determine the total minimum data value for each of the plurality of data bins, and obtain the maximum data values from each of the plurality of nodes to determine the total maximum data value for each of the plurality of data bins.

15. The system of claim 12, wherein a vector of quantiles are simultaneously estimated for the variate.

16. The system of claim 12, wherein the instruction identifies one or more constraints, and the quantile is estimated subject to the identified one or more constraints.

17. The system of claim 12, wherein:

the centralized node is further configured to define a second plurality of data bins, wherein each of the second plurality of data bins is associated with a different range of data values within the identified one of the plurality of data bins;

the plurality of distributed nodes are further configured to determine a total number of data values in the set of data that fall within each of the second plurality of data bins; and the centralized node is further configured to:

determine lower and upper quantile bounds for each of the second plurality of data bins based on the total number of data values that fall within each of the second plurality of data bins, identify one of the second plurality of data bins that includes the specified quantile based on the lower and upper quantile bounds for the second plurality of data bins, and estimate the specified quantile based on the identified one of the second plurality of data bins.

18. The system of claim 12, wherein the plurality of data bins include an equidistant set of grid points.

19. The system of claim 12, wherein one or more of the plurality of data bins includes a non-uniform set of grid points.

20. The system of claim 19, wherein the non-uniform set of grid points is defined to isolate one or more outlying data values.

21. The system of claim 19, wherein the non-uniform set of grid points is defined based on a likely location of the specified quantile within the set of data.

22. A non-transitory machine-readable storage medium comprising a computer-program product, including instructions configured to cause a data processing apparatus to:

receive an instruction to estimate a specified quantile for a variate in a set of data stored at a plurality of nodes in the distributed system;

identify a minimum data value and a maximum data value for the variate from the set of data;

define a plurality of data bins for the variate, wherein the plurality of data bins collectively range from the minimum data value to the maximum data value and each of the plurality of data bins is associated with a different range of data values in the set of data;

determine a total number of data values in the set of data that fall within each of the plurality of data bins;

determine lower and upper quantile bounds for each of the plurality of data bins based at least in part on the total number of data values that fall within each of the plurality of data bins;

identify one of the plurality of data bins that includes the specified quantile based on the lower and upper quantile bounds;

estimate the specified quantile based on the identified one of the plurality of data bins; and store data including the estimated specified quantile and the upper and lower quantile bounds, wherein when another plurality of data bins is defined, the stored data is used to narrow one or more spans of lower and upper quantile bounds of the another plurality of data bins.

23. The non-transitory machine-readable storage medium comprising the computer-program product of claim 22, further comprising instructions configured to cause the data processing apparatus to:

determine a total minimum data value and a total maximum data value within each of the plurality of data bins;

wherein the one of the plurality of data bins that includes the specified quantile is identified based also on the total minimum data value and the total maximum data value in the one of the plurality of data bins.

24. The non-transitory machine-readable storage medium comprising the computer-program product of claim 23, further comprising instructions configured to cause the data processing apparatus to:

determine a number of data values in each of the plurality of nodes that fall within each of the plurality of data bins;

determine a minimum and maximum data value in each of the plurality of nodes that fall within each of the plurality of data bins;

obtain the number of data values in each of the plurality of nodes to determine the total number of data values that fall within each of the plurality of data bins;

obtain the minimum data values from each of the plurality of nodes to determine the total minimum data value for each of the plurality of data bins; and sum the maximum data values from each of the plurality of nodes to determine the total maximum data value for each of the plurality of data bins.

25. The non-transitory machine-readable storage medium comprising the computer-program product of claim 22, wherein a vector of quantiles are simultaneously estimated for the variate.

26. The non-transitory machine-readable storage medium comprising the computer-program product of claim 22, wherein the instruction identifies one or more constraints, and the quantile is estimated subject to the identified one or more constraints.

27. The non-transitory machine-readable storage medium comprising the computer-program product of claim 22, further comprising instructions configured to cause the data processing apparatus to:

define a second plurality of data bins, wherein each of the second plurality of data bins is associated with a different range of data values within the identified one of the plurality of data bins;

determine a total number of data values in the set of data that fall within each of the second plurality of data bins;

determine lower and upper quantile bounds for each of the second plurality of data bins based on the total number of data values that fall within each of the second plurality of data bins;

identify one of the second plurality of data bins that includes the specified quantile based on the lower and upper quantile bounds for the second plurality of data bins; and estimate the specified quantile based on the identified one of the second plurality of data bins.

28. The non-transitory machine-readable storage medium comprising the computer-program product of claim 27, further comprising instructions configured to cause the data processing apparatus to:

repeat the instructions of claim 26, each time with a new plurality of data bins covering a narrower range of data values, until one of the data bins converges on the specified quantile.

29. The non-transitory machine-readable storage medium comprising the computer-program product of claim 22, wherein the plurality of data bins include an equidistant set of grid points.

30. The non-transitory machine-readable storage medium comprising the computer-program product of claim 22, wherein one or more of the plurality of data bins includes a non-uniform set of grid points.

31. The non-transitory machine-readable storage medium comprising the computer-program product of claim 30, wherein the non-uniform set of grid points is defined to isolate one or more outlying data values.

32. The non-transitory machine-readable storage medium comprising the computer-program product of claim 30, wherein the non-uniform set of grid points is defined based on a likely location of the specified quantile within the set of data.

* * * * *